3,222,308
PARTIALLY OXIDIZED ALKYD RESINS PREPARED FROM COMPLEX POLYBASIC ACIDS DERIVED FROM PETROLEUM FRACTIONS
Louis A. Joo, Crystal Lake, Ill., assignor, by mesne assignments, to Union Oil Company of California, Los Angeles, Calif., a corporation of California
Filed Aug. 31, 1961, Ser. No. 135,292
20 Claims. (Cl. 260—22)

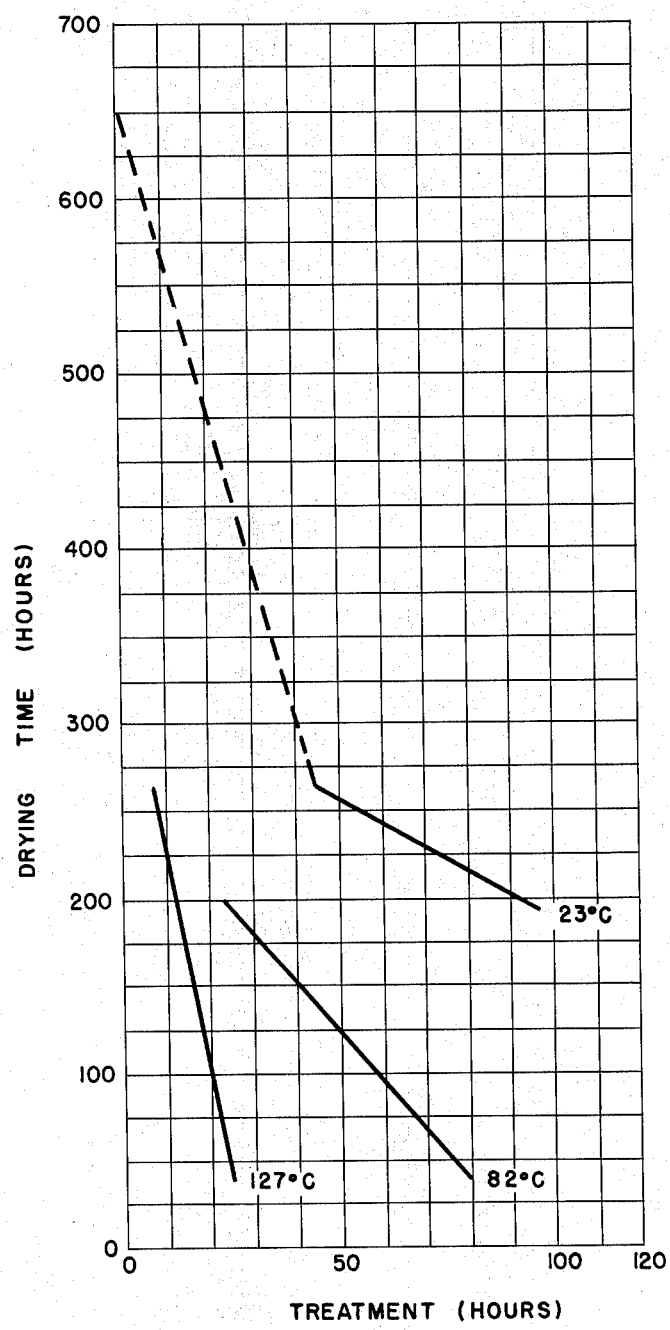

This invention relates to partially oxidized alkyd resins prepared from complex, high-molecular-weight, polynuclear, aromatic, alkylaromatic, heterocyclic, polybasic acids derived from selected petroleum fractions, which resins are characterized by their high solubility in more common organic solvents, resistance against attack by alkali and acid environments, high self-plasticizing ability, superior dielectric properties, and suitability for wire coatings and similar applications. More particularly, this invention relates to partially oxidized alkyd resins prepared from di- and polybasic acids derived from solvent extracts wherein the extracts are used as a source of complex, high-molecular-weight, polynuclear, aromatic, alkylaromatic, and condensed-ring heterocyclic nuclei for said acids, through metalation and carbonation reactions, the resulting acids are transformed into alkyd resins by reaction with an appropriate polyol, and the resulting esters are partially oxidized with common oxidizing agents such as dry oxygen, air, ozone, etc., at ambient or elevated temperatures.

This invention is an improvement over the process disclosed in copending application Serial No. 79,541, filed December 30, 1960 by Walter E. Kramer and Louis A. Joo, now U.S. Patent No. 3,154,507, issued October 27, 1964, which is directed to the use of an organic or inorganic metal salt and small amounts of oxygen or air during the esterification to enhance the properties of the final esterification product. In accordance with the instant invention, I have found that this procedure can be altered by omitting the salt and oxygen during esterification, and partially oxidizing the ester after it has been formed to enhance the properties thereof, control the air-drying characteristics, and for other improvements, including the fact that color-imparting metal driers are not needed and the impact strength of the alkyd resin is increased.

The alkyd resins represent a large group of compounds defined as polyesters of polyhydric alcohols and polycarboxylic acids or anhydrides, e.g., glycerol-phthalic anhydride resins. According to "The Technology of Plastics and Resins," P. Mason J. (1957), the alkyd resins (glyptals) are usually prepared by an esterification reaction as illustrated by the following general equation:

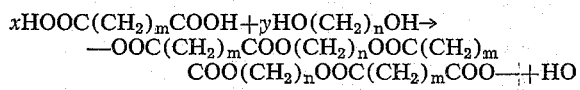

Because both reactants are polyfunctional, the reaction illustrates the growth of a linear polymer by such interaction of functional groups. The nature of the terminal groups in the chain is controlled by the relative number of moles of polybasic acid and polyhydric alcohol used for the reaction. When the acid is in excess, the majority of the terminal groups will be carboxyl. Using a dicarboxylic acid and a dihydroxy alcohol produces a linear, thermoplastic resin. It is known in this art that resins of the type of cyclic lactides or lactones are formed through cyclization reactions and resins of the crosslinked or net-polymer type are formed, the latter being of greater importance in the field of industrial plastics. The latter type of resins are formed when a component, acid or alcohol, is chosen which is tri-functional. Crosslinking is said to take place in two stages; in the first stage, normal chain growth proceeds by the mechanism of the foregoing reaction, that is, through α-esterification, and when about one-third of the free acid remains, or when the rate of linear esterification decreases, β-esterification begins, resulting in a rapid decrease of the acid content and the production of a resin in a gelled or insoluble state. This β-esterification is noted by the remarkable increases in molecular weight and decreases in solubility and fusibility of the product.

This invention is based on the discovery that alkyd resins prepared from di- and polybasic complex, high-molecular-weight acids, derived from solvent extracts obtained in the solvent refining of mineral lubricating oils and fractions thereof, by reaction under esterification conditions with polyhydric organic compounds followed by partial oxidation under certain controlled conditions form alkyd resins which exhibit high solubility, high chemical resistance, have self-plasticizing ability, form superior coatings and have excellent dielectric properties.

It becomes then a primary object of this invention to provide a new class of alkyd resins.

An object of this invention is to provide a new class of alkyd resins derived from dibasic and polybasic acids prepared from solvent extracts, obtained in the refining of mineral lubricating oils.

An object of this invention is to provide a new class of pre-oxidized alkyd resins prepared by the reaction of polyhydric alcohols and dibasic and polybasic acids prepared from solvent extracts obtained in the refining of mineral lubricating oils.

Another object of this invention is to provide a new class of alkyd resins, and a method of preparation by the reaction of polyhydric alcohols and dibasic and polybasic acids, with or without a fatty acid modifier, said polybasic acids being derived from solvent extracts obtained in the solvent refining of mineral lubricating oils and fractions thereof conducted in the absence of an organic or inorganic metal salt and small amounts of oxygen or air followed by oxidation under prescribed conditions.

Still another object of this invention is to provide a new class of modified and pre-oxidized alkyd resins prepared by reaction of polyhydric alcohols with dibasic and polybasic acid mixtures derived from the high-molecular-weight, complex, polynuclear, aromatic, alkylaromatic and/or heterocyclic compounds present in solvent extracts.

These and other objects of this invention will become apparent or be described as the specification proceeds.

The drawing is a graph showing the results of preoxidation experiments conducted in accordance with this invention.

The complex, polynuclear, high-molecular-weight alkylaryl, aryl, or heterocyclic polybasic acids used to prepare the resins of this invention are described in copending applications Serial Number 819,932, filed June 12, 1959, by Thomas W. Martinek, now U.S. Patent No. 3,128,302, issued April 7, 1964, and 79,661, filed December 30, 1960, by Walter E. Kramer, Louis A. Joo and Robert M. Haines, now U.S. Patent No. 3,153,087, issued October 13, 1964. Although the polybasic acids may be prepared by the various known methods in the prior art for converting aromatic materials to carboxylic acids, such as are described in said copending applications, using solvent extracts as starting materials, the technique set forth in said later application represents a preferred method of preparation because of the increased efficiency of the process and the higher yields of polybasic acids of high purity that are obtained. The starting materials for the reaction are well-known by-products of the solvent extraction of mineral lubricating oils and are adequately described as those aromatic materials separated from mineral lubricating oils and their fractions, e.g., those aromatics obtained in the manufacture and refining of neutral oils and bright stocks during treatment with a selective solvent designed to extract the predominantly aromatic materials from the paraffinic materials. Solvent extracts resulting from the treatment of mineral lubricating oils for the purpose of separating non-aromatic hydrocarbons (the raffinate and finished oil) from the aromatic hydrocarbons (the extract and waste product) may be used and are preferred as starting materials.

Since the general process of refining mineral lubricating oils in which solvent extracts are obtained is well-known, it is only necessary for present purposes to describe a typical procedure for obtaining same and give some examples by way of illustration.

In a typical operation, desalted crude oil is first charged to a distillation unit where straight-run gasoline, two grades of naphtha, kerosine, and virgin distillate are taken off, leaving a reduced crude residue. The reduced crude is continuously charged to a vacuum distillation unit where three lubricating oil distillates are taken off as side streams, a light distillate is taken off as overhead, and a residuum is withdrawn from the bottom of the tower. The residuum is charged to a propane-deasphalting unit wherein propane dissolves the desirable lubricating oil constituents and leaves the asphaltic materials. A typical vacuum residuum charge to the propane-deasphalting unit may have an API gravity of 12.9°, viscosity SUS at 210° F. of 1249, flash 585° F., fire 650° F., C.R. of 13.9 weight percent, and may be black in color. The deasphalted oil may have an API gravity of 21.5° to 21.8°, viscosity SUS 210° F. of 165–175, NPA color 6–7, flash 575° F., fire 640° F., and C.R. of 1.7–2.0. The deasphalted oil and various lubricating oil distillates from the reduced crude are subjected to solvent extraction for the separation of non-aromatic from aromatic constituents prior to use. The refined oil or "raffinate" from the extraction processes is used per se, or as blending stock, for lubricating oils, and the solvent extract, predominating in complex aromatic constituents, is distinctively useful in accordance with this invention.

For example, a crude oil from an East Texas field with an API gravity of 33.1 was topped to remove such light fractions as gasoline, naphtha, kerosine, and a light lubricating distillate. The vacuum residue was a reduced crude having a viscosity of 1251 SUS at 210° F., 2.2 percent sulfur, and an API gravity of 12.6. After propane-deasphalting, the oil had a viscosity of 174 SUS at 210° F. and an API gravity of 21.7. This deasphalted oil was treated with phenol to produce a raffinate from which an aviation lubricating oil could be prepared. The oil extracted by phenol treatment after removal of phenol, is ready for use as the starting material in accordance with this invention.

Solvents other than phenol may be used to obtain the extraction product used in accordance with this invention, for example, liquid sulfur dioxide, nitrobenzene, 2,2 dichloroethyl ether, chlorophenol, trichloroethylene, cresylic acid, pyridine, furfural, or the Duo-Sol solution (a proprietary composition comprising liquid propane and cresol) may be used. When using phenol, it is possible to vary the characteristics of the extract and raffinate products considerably by adjustment of the amount of water present. A raffinate of relatively low viscosity index can be obtained by using a water solution of phenol during the extraction, and a raffinate of high viscosity index can be obtained by using anhydrous phenol. Following are the physical characteristics of typical extract products, from lubricating oil stocks derived from various crude oils and other source hydrocarbon materials, which may be used in accordance with this invention.

TABLE I.—SOURCES AND PHYSICAL CHARACTERISTICS OF SOLVENT EXTRACTS

| Ext. No. | Crude source | Solvent | API grav. | Sp. gr. at 10° F. | Vis/ 100° F. | Vis/ 130° F. | Vis/ 210° F. | V.I. | Pour | ° F. Flash | ° F. Fire | Iodine No. (Wijs) | Percent C.R. | Percent Sulfur |
|---|---|---|---|---|---|---|---|---|---|---|---|---|---|---|
| 1 | East Tex | Phenol | 11.1 | | 23,319 | 4,750 | 282 | −40 | +55 | | | | 7.2 | 2.60 |
| 2 | do | do | 15.4 | | 15,000 | | 285 | +39 | | | | | | |
| 3 | do | do | 12.6 | | 36,410 | 4,310 | 310.1 | −1 | +80 | | | | 4.7 | 2.27 |
| 4 | do | do | 14.6 | | 19,500 | 4,305 | 313 | +27 | +90 | | | | 4.7 | 2.2 |
| 5 | do | do | 15.4 | | 32,500 | | 372 | +5 | +80 | | | | 4.13 | 2.33 |
| 6 | do | do | 13.7 | | 25,000 | 5,400 | 355 | +27 | +80 | | | | | 2.18 |
| 7 | do | do | 8.6 | | 145,000 | 19,000 | 616 | 0 | +70 | | | | | |
| 8 | do | do | 10.5 | | 12,676 | 2,514 | 172.1 | −101 | +60 | | | | | 2.18 |
| 9 | Sante Fe Springs | do | 10.2 | 0.9984 | | | 371 | | +65 | 520 | 600 | 69.4 | | |
| 10 | Texas | Furfural | 13.0 | 0.9791 | | | 1,500 | | +85 | 470 | 515 | 57.4 | | |
| 11 | Penn | Chlorex | 12.2 | 0.9843 | | | 1,365 | | +85 | 560 | 630 | 71.4 | | |
| 12 | Penn | Nitro benzene | 10.0 | 1.000 | | | 1,500 | | +75 | 555 | 640 | 60 | | |
| 13 | Mid-Cont | Propanecresol | 14.4 | 0.9699 | | | 1,500 | | +100 | 540 | 605 | 63.7 | | |
| 14 | do | Phenol | 13.6 | | | | 41.7 | −82 | +20 | | | | | |
| 15 | do | Chlorex | 13.6 | | | | 200 | −61 | +75 | | | | | |
| 16 | do | Phenol | 8.9 | | | | 569 | | +75 | | | | | |
| 17 | do | Furfural | 14.9 | | | | 50.2 | 25 | +20 | | | | | |
| 18 | East Tex | Phenol | 13.5 | .976 | 25,000 | | 341 | 17 | +65 | 530 | 610 | | 5.76 | 2.36 |
| 19 | do | do | 11.1 | | | | 61.5 | −56 | +40 | 435 | 475 | | 0.42 | 2.7 |
| 20 | do | do | 13.7 | | | | 360 | +25 | +65 | 550 | 630 | | 5.5 | 2.3 |
| 21 | do | do | 7.7 | | | | 71.1 | −128 | +35 | 420 | 495 | | 0.86 | 3.2 |
| 22 | do | do | 7.3 | | | | 796 | −76 | +65 | 520 | 610 | | 7.7 | 3.0 |
| 41 | do | do | 17.6 | | 154 | 80 | 41 | 11 | +30 | 400 | 435 | | 0.1 | 2.0 |
| 42 | do | do | 13.7 | | 26,000 | 5,615 | 360 | +25 | +65 | 550 | 630 | 37.5 | 5.5 | 2.3 |
| 43 | do | do | 11.1 | | 1,054 | 331 | 61.5 | −56 | +40 | 435 | 475 | 40.0 | 0.4 | 2.7 |
| 44 | do | do | 7.7 | | 2,007 | 611 | 71.1 | −128 | +35 | 420 | 495 | 38.6 | 0.86 | 3.2 |
| 45 | do | do | 7.3 | 1.019 | 230,000 | 20,800 | 796 | −76 | +65 | 520 | 610 | | 7.7 | 3.0 |

Extract No. 41 was obtained in the production of 85 Vis neutral, had an average molecular weight of 300, and contained 76.8% aromatics (by the silica gel procedure).

Extract No. 42 was obtained in the production of 150 Vis Bright Stock, had an average molecular weight of 590, and contained 86% aromatics, 14% saturates, 86.2% carbon, 11.4% hydrogen, and averaged 3.3 aromatic rings per aromatic molecule.

Extract No. 43 was obtained in the production of 170 Vis neutral, had an average molecular weight of 340, contained 84.1% aromatics, 15.9% saturates, 86.4% carbon, 10.7% hydrogen and averaged 2.7 aromatic rings per aromatic molecule.

Extract No. 44 was obtained in the production of 200 Vis neutral, had an average molecular weight of 340, contained 87% aromatics, and 13% saturates.

Extract No. 45 was obtained in the production of 160 Vis Bright Stock, and contained 92% aromatics and 8% saturates.

The solvent extracts from lubricating oils used as starting materials for this invention have the following general properties and characteristics:

TABLE II

| Characteristic: | Range of value |
|---|---|
| Gravity, ° API | 7.0–18.3 |
| Specific gravity, 60° F./60° F. | 0.945–1.022 |
| Viscosity SUS @ 210° F. | 40–1,500 |
| Viscosity index | −128–+39 |
| Pour point (max.), ° F. | +30–+100 |
| Molecular weight, average | 300–750 |
| Boiling point, ° F. | Above 600 |
| Total sulfur, percent wt. | 0.5–4.5 |
| Sulfur compounds, percent wt. | 5–45 |
| Aromatic hydrocarbons | 25–90 |
| Av. number of aromatic rings/mean arom. mol. | 1.7–3.5 |

The gravities of the extracts in general increase with increase in the viscosity of the raffinate at a constant viscosity index. Stated otherwise, the gravities of these extracts increase with decrease in viscosity index of the raffinate at a constant viscosity. For the production of 100±5 VI neutral oils, the viscosities of the extracts increase with increase in stated viscosities of the neutral oils (raffinates). The pour points of extracts are high and are affected by changes in the depth of extraction. The sulfur contents are also affected by the depth of extraction. The solvent extracts are characterized by containing aromatic and sulfur compounds in the range of 70–90%, the remainder being principally saturates, or material behaving as saturates, together with a minor proportion of from 3.0 to 6.0% of organic acids. The organic acids present are not susceptible to extraction by the use of aqueous strong caustic because of emulsion formation. Very little asphaltic material is present in solvent extracts and they contain no materials volatile at room temperatures.

The materials shown in Tables I and II are merely illustrative and the invention is not to be limited thereby.

It is apparent that the composition and characteristics of the acids, or resins prepared therefrom, will vary somewhat depending on the concentration and types of polynuclear aromatic hydrocarbons in the solvent extracts used. In such complicated mixtures as solvent extracts from petroleum oils, and solvents extracts from lubricating oil fractions, the content of aromatic materials may vary from about 20% to 100% by weight.

It is to be understood, accordingly, that the invention is broadly applicable to any petroleum fraction which contains at least about 20% by weight of reactable polynuclear aromatic hydrocarbons as herein defined. These types of complex aromatic hydrocarbons are found in high concentrations in solvent extracts obtained in the manufacture of neutrals and bright stocks, all of which materials are to be understood as suitable starting materials.

It is to be understood that the invention is particularly applicable to any solvent extract from the refining of mineral lubricating oils for the purpose of separating nonaromatic and aromatic hydrocarbons, that is, where the solvent exerts a preferential selectivity for the non-paraffinic constituents. The extracts are substantially freed of solvent, e.g., phenol extracts are dephenolized by steam stripping, so that they contain practically no solvent.

In preparing the polybasic acids to be used in accordance with this invention, the starting solvent extract material is reacted first with an alkali metal in elementary form. For this purpose sodium, lithium, potassium, rubidium, and cesium, and mixtures and alloys of these, may be used, that is, members of Group IA of the Periodic Chart of the Atoms, Hubbard, 1941, Revised Chart. About 30 parts of solvent extract are used per 1 to 5 parts of alkali metal. The reaction may be carried out at temperatures as low as −60° C. and as high as 0° C. The prior art solvents for this type of reaction, such as dimethyl glycol ether, diemthyl ether, methyl alkyl ethers, dialkyl glycol ethers, tetrahydrofuran, dioxane and trimethylamine may be used.

The reaction of the alkali metal with the reactive, complex, aromatic components does not occur unless steps are taken as shown in said copending application, to overcome the effects of certain reactive impurities in the complex mixture which normally coat the sodium surface and prevent reaction. The undesirable reactive impurities present in the mineral oil mixture may be traces of water, organic acids, mercaptans and other sulfur compounds, phenols, and other nitrogen- or oxygen-containing compounds. The reaction can be advantageously effected if fresh sodium surfaces are continuously exposed until all undesired reactive impurities have reacted, or if sufficient sodium surface to react with all such impurities plus a moderate excess is used. Another expedient is to use a large excess of sodium metal. It appears that once the undesired reactive impurities have reacted, the desired reaction can take place on the excess clean sodium surface. It also appears that once the complexing reaction occurs, the oil solution of complex begins to dissolve the undesired reaction-product coating from the sodium surface, in effect cleaning the particle surface and rendering more surface available for reaction.

The reaction is difficult to start unless an excess of sodium and fresh sodium surface is used. Certain expedients have been found advantageous. Among these are continuous shearing of the sodium particles until the reaction starts. This has been accomplished with a Brookfield counter-rotating stirrer. Other shearing or crushing devices, such as a Waring Blendor, colloid mills, mullers, ball mills, and the like, also may be used. Even with continuous shearing or crushing, many minutes and sometimes hours are required before the desired complexing reaction starts. The length of time required depends on the relative amounts of undesired impurities present, and the sodium surface made available. The inhibiting or dominating effect of the undesirable reactive impurities is one reason why petroleum hydrocarbon sources were not exploited as starting materials for this type of reaction.

Another expedient found advantageous resides in the use of a preformed sodium dispersion in an inert liquid. Such dispersions and their preparation are well known in the art. According to said application Serial No. 819,932, by Thomas W. Martinek a large excess of dispersed sodium must be used to initiate the reaction, unless steps are taken to remove the coating of undesired reaction products from the sodium surface. Such steps include the use of mills.

Still another expedient, and the preferred one, is the actual preparation of a sodium dispersion in the solvent extract to be reacted. The undesirable impurities appear to completely react with the sodium during preparation of the dispersion, and as a consequence, clean sodium surface is available for the desired reaction as soon as the so-called "active ether" or reaction solvent (supra) is mixed with the sodium-reactive-component mixture. The desired reaction then is practically instantaneous and proceeds smoothly and rapidly to completion with only a slight excess of sodium.

When the reaction with alkali metal is complete, as evidenced by its dissolution, and the appearance of the dark blue-colored adduct, the reaction mixture is treated with carbon dioxide, either at about the same or a different temperature as was used during the reaction with alkali metal. $CO_2$ treatment causes a dissipation of the color and the formation of the alkali metal salt of the polybasic acid. The reaction mixture is next washed with water and allowed to separate into a solvent phase and a water phase. Several applications of 1 volume of water per 5 volumes of reaction mixture may be used and the water layers collected. Counter-current water-washing may be used. The resulting water phase is acidified with an acid such as a hydrohalic acid, sulfuric acid, or phosphoric acid. This causes the polybasic, polynuclear aromatic acids to separate or precipitate from the aqueous mixture.

EXAMPLE I

A mixture of polybasic acids from aromatic extract oil No. 43 of Table I, derived from a petroleum lube oil stock by phenol extraction in the preparation of 170 vis., 100 V.I. neutral oil, was prepared by the following procedure. A solution of 100 g. of aromatic oil in 675 cc. of dry tetrahydrofuran was placed in a 2100-cc. flask equipped with a Brookfield counter-rotating stirrer and gas-inlet and -outlet. The solution was cooled and maintained at 10–30° C. while 8.3 g. of metallic sodium in the form of $3/16''$ cubes were added, after which cooling was maintained during a two-hour reaction period. No complex formation appeared to occur until approximately 25 minutes had elapsed. Thereafter, a strong color change was noted and the reaction appeared to proceed relatively rapidly.

After stirring for two hours, the mixture was cooled to −60° C. while an excess of carbon dioxide gas was introduced. The color was discharged by reaction with carbon dioxide, but no precipitation was noted. The unreacted sodium (5.1 g.) was removed, the tetrahydrofuran was stripped from the reaction mixture by applying a vacuum, after which the remaining liquid was combined with ether and washed with water.

The resulting aqueous phase was acidified and washed with ether to recover the free acids and other reaction products. About 89% w. of the original oil feed stock was recovered, and about 11% had reacted to form the acidic product of this invention. The product had an indicated average molecular weight of 686 and a saponification value of 171. The calculated equivalent weight was 328 indicating 2.1 acid groups per molecule. However, the true average molecular weight probably was somewhat lower than 686, the indicated average molecular weight being higher than actual because of molecular association in the benzene solvent during its determination.

EXAMPLE II 100 gms. of solvent extract and 675 ml. of dry tetrahydrofuran were charged to a one-liter, 3-necked flask equipped with a stirrer, thermometer, pressure-equalized drop-funnel, gas-inlet with rotometer, and gas-outlet. A dry nitrogen atmosphere was maintained. Approximately 100 gms. of Alundum balls (a proprietary product comprising white fused alumina containing 99% $Al_2O_3$ with traces of soda, iron, titania and silica) $5/16''$ diameter were charged and agitation started. The solution was cooled to −20° C. and 8.3 gms. of sodium as a 20% dispersion in toluene were added. After 5 minutes, no reaction had occurred and the solution was allowed to warm. After 25 minutes, the temperature had risen to −7° C. and a few particles of sodium appeared to be reacting, i.e., the deep color of the complex was seen to be forming on the surface of a few particles when agitation was momentarily stopped. Within an additional 17 minutes, the reaction was proceeding smoothly and the dry carbon dioxide atmosphere was introduced to the flask in excess at −18° C. over a period of 78 minutes. The reaction mixture was worked up as in the previous example after the excess sodium was destroyed with water. Hydrogen evolution from the remaining sodium indicated that only 48% of the sodium had reacted. Approximately 84.5% of the oil was recovered, indicating 15.5% had reacted. The acids recovered weighed 22.5 gms. and had a saponification value of 241, indicating an equivalent weight of 233, and contained 2.8% sulfur. With a similar experiment, the acids recovered had a saponification value of 323, indicated 173 equivalent weight, with an indicated average molecular weight (cryoscopic) of 600. They contained 3.0% sulfur. The ratio of molecular weight to equivalent weight was 3.4, indicating a mixture containing acids with more than 2 acid groups per molecule. Extract No. 18 of Table I was used in this example.

Suitable carrier liquids to form the initial mixture of alkali metal may be any solvent which is non-reactive in relation to the alkali metal, and which does not interfere with the reactions taking place. The filter press used may be of the plate-and-frame type employing kieselguhr or diatomaceous earth as the filter aid or filter means. The water used in the process should be free of reactable salts and other impurities. Ordinary water-purification precautions applicable to organic synthesis should be applied to insure against contamination of the end products from this source. The hydrocarbon solvent used may be any liquid, or liquefiable, inert, aliphatic hydrocarbon. Propane, butane, heptane, octane, etc., may be used for this purpose of removing unreacted oil from the mixture. The solvents used in stripper operations may be any ether or ketone having an appreciable solubility for the complex acids product. Included in this category are methyl ethyl ketone, diethyl ketone, acetone, methyl ether, diethyl ether, propyl ether, and dibutyl ether. Mixed ethers and ketones are also useful. The acid used may be hydrochloric, sulfuric, phosphoric, and the like; non-mineral acids such as acetic and chloroacetic may also be used.

In operating the process on a continuous basis, solvent-extract oil and alkali metal are pumped through heat exchangers to a colloid mill where the alkali metal, in this case sodium, is dispersed in the reactant extract oil. The dispersion passes through a cooling heat-exchanger into a second colloid mill where it is intimately mixed with solvent (such as tetrahydrofuran). The reaction mixture then passes through cooling heat-exchangers to the mixing- and carbonating-vessel where carbon dioxide is introduced by means of a manifold. The carbonated solution is pumped from the reactor to a final carbonation zone where excess carbon dioxide is injected under pressure.

The carbonated mixture then passes to a continuous rotary filter which removes unreacted sodium and other insoluble materials, and the filtrate passes in heat-exchange contact with the dispersion by means of a suitable chamber. The effluent from the exchanger passes to the top of a tower wherein solvent is removed overhead and conveyed through heat exchangers and the chamber.

The residue is conveyed to a continuous extraction tower where water and ether are introduced countercurrently. The hexane phase is stripped in another tower to recover unreacted oil as bottoms. The ether is conveyed to a second continuous extraction tower into which mineral acid (hydrochloric acid) and the alkaline extract from the continuous extraction tower are introduced countercurrently. The water (acidic) phase is discharged or treated for water recovery. The upper phase is stripped, whereby an overhead ether fraction is taken off, and the polybasic product is recovered.

The di- or polybasic polynuclear acids produced are mixtures of acids, having aromatic nuclei of the naphthalene, phenanthrene, and anthracene type with several alkyl groups on each aromatic nucleus, and wherein the content of sulfur, nitrogen, and oxygen is in the form of heterocyclic rings associated therewith. The acids are more accurately described as dihydrocarboxylic acids since there is a change in structure with the introduction of the carboxyl groups. A very simplified structure without showing the numerous alkyl substituents or the heterocyclic nuclei and the relative percentage of each structure may be:

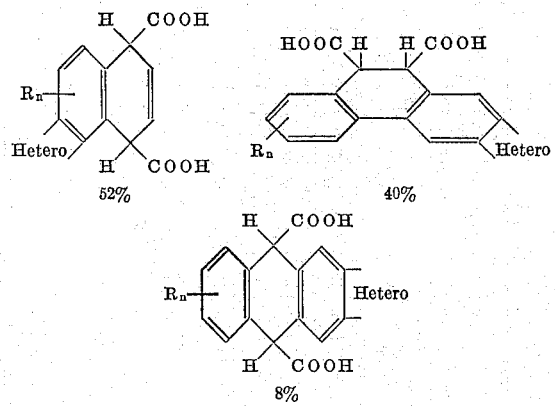

where R comprises alkyl substituents having a sum of about 15 to 22 carbon atoms in each formula, $n$ is the number of such alkyl groups, which may be from 3 to 10, and "Hetero" illustrates one or more S-, N-, or O-containing heterocyclic rings in the molecule. The molecular weight of the acids ranges from 300 to 600, and the average from 325–450.

The following Table III gives the physical properties of typical extract di-, or polybasic acids:

TABLE III

| Property: | Value |
|---|---|
| Acid number | 170–280 |
| Melting point, °C. | 80–90 |
| Bromine No. | 16–24 |
| Percent sulfur | 1.7–2.3 |
| Color | Deep red |
| Percent unsaponifiables | 2–6 |

In order to illustrate the preparation of oxidized alkyd resins in accordance with this invention, the following examples are given.

EXAMPLE III

A mixture consisting of 180 g. of the "extract dibasic acids" of Example I, 50 g. of glycerine and 253 g. of dehydrated castor oil acids was placed in a resin kettle, equipped with a water-trapped reflux condenser, and cooked at 450° F. under a blanket of nitrogen. The condensation reaction proceeded at a rate such that the acid number diminished to about 4 at the end of two hours. The resin condensation product had a bromine number of 39.

100 g. of this alkyd resin was placed in a 500-ml. flask provided with a thermometer and a fritted gas-dispersion tube. The flask was placed in an oil bath, and the temperature of the resin was kept at 127° C. as air was introduced through the gas-dispersion tube at a rate of 30–40 ml./minute for 20 hours. After 20 hours, the alkyd resin was removed from the flask and 70 g. of this oxidized resin was mixed with 30 g. of xylene. Several films were cast and air dried or baked. The films which were air dried (without any drying agent) became tack-free after 100 hours. The same alkyd resin which was not so treated became tack-free only after more than 600 hours. The baked films were uniform, did not exhibit any shrinkage, and were tack-free after baking at 160° C.

EXAMPLE IV

The treatment described in Example III, wherein the alkyd resin was treated with air for 10 hours at 127° C., with another portion of the resin was repeated. The films cast from this resin became tack-free after 210 hours of drying.

EXAMPLE V

Several runs were made as described in Example III except that the air-blowing reaction was carried out at 82° C. Several films were cast from the resulting oxidized resin which gave tack-free times as shown for the 82° C. curve on the graph.

The results of Examples III, IV and V are shown in the graph for comparison.

EXAMPLE VI

The treatment described in Example III was repeated at room temperature (23° C.) for various lengths of time. Prior to the treatment, the alkyd resin was dissolved in xylene (50–50%) to decrease the viscosity. After the treatment with air, the xylene content was determined and adjusted to 70% alkyl–30% xylene. The tack-free times for these runs are given in the 23° C. curve on the drawing.

Oxidized alkyd resins prepared in accordance with Examples III and IV, wherein the oxidation is carried out at a temperature of about 127° C., show drying times which are comparable to those shown by the 127° C. curve in the drawing.

The polyhydric alcohols to be used to prepare the resins of this invention include any organic compounds having three or more hydroxyl groups in the molecule. Examples of polyhydric alcohols are given as follows:

The trihydric alcohols and higher polyhydric alcohols—
Glycerol
Diglycerol
Butantriol, 1,2,3
Erythritol and optically active forms thereof
Pentaerythritol The pentahydric alcohols ($CH_2OH(CHOH)_3CH_2OH$) and isomers thereof—
Adonitol
The riboses
d- and l-Arabitol
Xylitol The hexahydric alcohols ($CH_2OH(CHOH)_4CH_2OH$)—
Dipentaerythritol
d-Mannitol
d-Sorbitol
Dulcitol The heptahydric alcohols—
Perseitol
Volemitol The fatty acids used in accordance with this invention as modifiers include the saturated and unsaturated fatty acids and their mixtures from such sources as:

Vegetable oils—

| | |
|---|---|
| Babassu oil | Mustard oil |
| Castor oil | Olive oil |
| Coconut oil | Oiticica oil |
| Corn oil | Palm oil |
| Cottonseed oil | Palm kernel oil |
| Hempseed oil | Peanut oil |
| Linseed oil | Permilla oil |
| Poppyseed oil | Rapeseed oil |
| Safflower oil | Soybean oil |
| Sunflower oil | Tall oil (commercial) |
| Tung oil | Walnut oil |

Animal fats and oils—

| | |
|---|---|
| Butter fat | Tallow (beef) |
| Lard | Tallow (mutton) |
| Neatsfoot | |

Marine fats and oils—

| | |
|---|---|
| Herring | Sperm (body) |
| Menhaden | Sperm (head) |
| Sardine | Whale |

The foregoing are sources of such saturated fatty acids as caproic, caprylic, capric, lauric, myristic, palmitic, stearic, arachidic, behenic and lignoceric acids, that is saturated fatty acids having from 6 to 24 carbon atoms.

The unsaturated organic acids to be used in accordance with this invention include those of less than 10 carbon atoms e.g., acrylic, crotonic, isocrotonic, α-methylacrylic, vinylacetic, β-ethylacrylic, ββ-dimethylacrylic, β-pentenoic, allylacetic, angelic, tiglic, hydrosorbic, isohydrosorbic, pyroterebic and teracrylic acid, and the so-called unsaturated fatty acids which are found in fats, e.g., 9,10-decylenic, undecylenic, 9,10 dodecylenic, petroselinic, vaccenic, parinaric, tariric, cetoleic, lauroleic, myristoleic, palmitoleic, oleic, gadoleic, erucic, ricinoleic, linoleic, linolenic, eleostearic, licanic, arachidonic and clupanodonic acids to include monomeric acids having from 10 to over 26 carbon atoms per molecule and the dimer acids with two or more carboxyl groups having up to 36 carbon atoms. Rosin acids, conjugated acids, hydroxy acids and terpenic acids in this range are also included. The hydrogenated and dehydrated forms thereof are intended as reactants for the preparation of the resins of this invention. A preferred species of dehydrated castor oil fatty acids contains about 2% palmitic acid, about 1% stearic acid, about 7% oleic acid about 87% ricinoleic acid, and about 3% linoleic acid. Dehydrated corn oil acids, dehydrated hempseed acids, and dehydrated cottonseed acids may also be used. For purposes of obtaining cross-linked resins, the unsaturated fatty acids are used, and cross-linking is also obtained between the complex nuclei of the polybasic extract acids. The type or molecular weight of the unsaturated organic acid used influences the properties of the resin product. By using lower-molecular-weight unsaturated acids the drying properties of the products are lengthened but the tensile strength of the resin is enhanced. Preferably unsaturated acids having from 10 to 26 or more carbon atoms are used where the objective is to obtain a product having desirable drying properties, and exhibiting the other properties sought in the coating, plastics and related arts.

Alkyd resins prepared from the polybasic acids of Example II, having a saponification value of 241, using the procedure of Example III and the indicated amounts (in grams) of polyol and modifying fatty acid in Table IV, when partially oxidized at a temperature of about 20° to 130° C. for between about 5 to 80 hours, come within the scope of this invention.

TABLE IV

| Resin No. | PBA,[1] grams | Grams—Polyol | Grams—Mod. acid |
|---|---|---|---|
| 1 | 180 | 60—glycerine | 250—DCOA.[2] |
| 2 | 180 | 33—glycerine | |
| 3 | 180 | 81—diglycerol | 250—DCOA. |
| 4 | 180 | 36—pentaerythritol | |
| 5 | 200 | 60—pentaerythritol | 200—corn oil acids. |
| 6 | 200 | 60—adonitol | 180—lard oil acids. |
| 7 | 200 | 60—xylitol | 50—castor oil acids. |
| 8 | 200 | 80—d-mannitol | 250—castor oil acids. |
| 9 | 200 | 60—glycerine | 250—linoleic acids. |
| 10 | 100 | 40—xylitol | 100—oleic acid. |
| 11 | 100 | 33—glycerine | 250—caproic caid. |
| 12 | 180 | 50—diglycerol | 100—lauric acid. |
| 13 | 180 | 100—adonitol | 300—myristic acid. |
| 14 | 200 | 200—adonitol | 200—stearic acid. |

[1] PBA—Polybasic extract acids.
[2] DCOA—Dehydrated castor oil acid.

As seen from the foregoing examples in Table IV, the amount of modifying unsaturated acid may range from about 15% to 65% of the total reactants; or, the resins may be prepared without a modifying acid. Generally, the use of 20% of modifying acid gives the desired amount of flexibility to the finished resin, and the use of amounts below 15% does not materially modify the properties of the finished resin. The proportions of extract polybasic acid and polyol range from about 35 to 70% by wt. of the former to a neutralizing amount of the latter which may be as high as 50% by wt.

The broad oxidation temperature is about 20° C. to 130° C., and temperatures above this range are to be avoided since there is danger of gelation. The preferred oxidation temperature is about 100 ±20° C. The oxidation time is determined partly by the temperature. The higher the temperature, the shorter the time; in general, about 1 to 100 hours is sufficient. Similarly, the oxygen concentration is limited by the temperature and time. In general, about 5 to 50 ml. of air/min./100 ml. of resin is adequate, although amounts above and below this range may be used. By control of the time and oxygen concentration, the properties of the end product can be directed in desired pattern or combinations of film strength, hardness, brilliance, toughness, and flexibility. The preferred oxygen concentration is about 5 to 20 ml. air (calculated at 20% oxygen)/min./100 ml. of resin sample. The upper limit of oxygen concentration is limited only by the amount of foaming that can be tolerated in the apparatus used.

With regard to the foregoing considerations, if the resin were oxidized at 150° C. for about one hour using 20 ml. of air/min./100 ml. of resin, the product would have a very short drying time but would be gelled and useless. Similarly, resins prepared without the fatty acid modifier and oxidized under the optimum conditions would not share all of the desirable properties of the acid-modified resins, but are useful for other purposes, e.g., as metal coatings, fillers, and insulators. Pre-oxidation of modified resins in accordance with this invention has the tendency to increase the molecular complexity, as by promoting cross-linking through the unsaturated linkages of the adjacent fatty acid nuclei of the ester molecules. This is evidenced by the higher viscosity and higher molecular weight of the products obtained.

Without limiting the invention to any theories as to the overall reactions involved, the following are illustrative of the formulae of the various intermediate, cross-linked and partially oxidized polyester products that may be formed or be present in the products of this invention, wherein the formula (1) $\quad R(COOH)_n$ is used as the formula of the complex polybasic acid starting material derived from solvent extracts by metallation, carbonation and acidification, as herein disclosed, and $n$ has a value of 2 to 5; the formula (2) $\quad R^1COOH$

is used as the formula of a saturated fatty acid having from 6 to 24 carbon atoms in the $R^1$ group; the formula (3) $\quad R^3=R^2COOH$

is used as the formula of the unsaturated fatty acid wherein $R^2$ and $R^3$ each contain from 6 to 12 carbon atoms and may contain other double-bonded carbon atoms; the formula (4) $\quad R^4(OH)_m$

is used to illustrate the formula of the polyol, $R^4$ containing 3 to 10 carbon atoms and $m$ having a value of 3 to 10, I. Simple cross-linked polymeric esters formed from the reaction of X+2 moles of polyol (glycerol) with X+1 moles of extract polybasic acid and cross-linked through oxidation of the complex R group of the extract dibasic acid

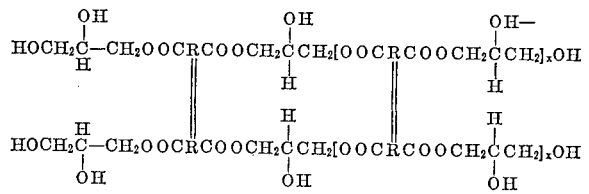

II. Complex cross-linked linear polymeric esters of Type I prepared with an excess of complex dibasic acid having the formula:

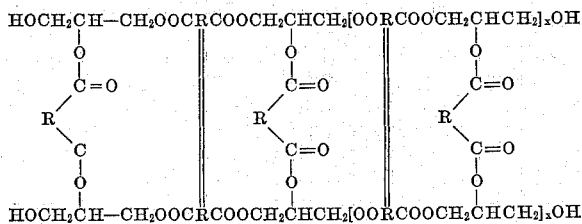

III. Complex cross-linked polyesters of Type II, wherein two or more of the terminal hydroxyl groups are esterified and cross-linked with one or more molecules of dibasic extract acid, IV. Simple linear polyesters prepared with a saturated or an unsaturated modifying acid having the formulae:

(a) $R^1COOCH_2CHOHCH_2$
  $OOCRCOOCH_2CHOHCH_2OOCR^1$
(b) $R^3=R^2COOCH_2CHOHCH_2OOCRCOOCH_2$
  $CHOHCH_2OOCR^2=R^3$
(c) $R^1COOCH_2CHOHCH_2OOCRCOOCH_2$
  $CHOHCH_2OOCR^2=R^3$

V. Oxidized esters of Type IV (b) having the formula:

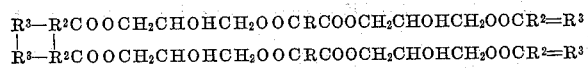

VI. And oxidized esters of Type IV (a) and IV (c) having the formulae:

(a)
  $R^1COOCH_2CHOHCH_2OOCRCOOCH_2CHOHCH_2OOCR^1$
  $R^1COOCH_2CHOHCH_2OOCRCOOCH_2CHOHCH_2OOCR^1$ (c)
  $R^1COOCH_2CHOHCH_2OOCRCOOCH_2CHOHOOCR^2-R^3$
  $R^1OOCH_2CHOHCH_2OOCRCOOCH_2CHOHOCR^2-R^3$

VII. Simple branched polyesters, prepared with a modifying unsaturated fatty acid, having the formula:

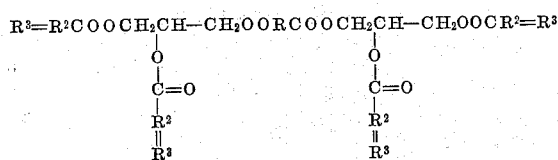

and

VIII. Oxidized products prepared from esters of Type VII, having the formula,

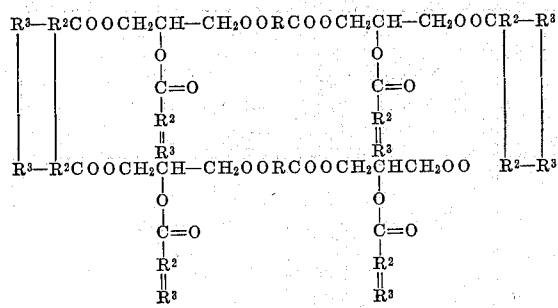

the $R^2=R^3$ groups of which can be cross-linked within the molecule or cross-linked to other similar molecules in chains, or the cross-linking can be through —OOCR¹COO groups.

As is known in this art, the oxidation of the alkyd resins involves the double bonds present in the unsaturated organic carboxylic acid, and in this case also the unsaturations in the complex R radical of the polybasic extract acids to form

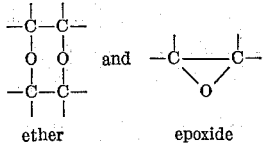

ether      epoxide linkages both of which decompose to form the cross-linked bonds:

to build up chains and/or a lattice work of molecules having the desired properties.

Accordingly, the process of the instant invention is applicable to any of the modified resins disclosed in application Serial No. 79,541 whereby the advantages of producing a more viscous resin having a shorter drying time are attained. Normally, polybasic acid resins of the alkyd type require 600 hours or more to dry without a drier. The shorten non-catalyzed drying times of the resins of this invention are in the order of less than 50 hours. Furthermore, the resins of this invention exhibit no shrinkage on baking, which property previously was only attained if a metal salt, e.g., iron chloride, was present during resin formation. The presence of a drier is harmful to impact resistance and color, and the resins of this invention require either no drier or such small amounts, in the order of .001 to .01%, as to not affect the properties of the end product.

With the exception of the inclusion of a metal salt and oxygen, the steps of preparing the resins prior to oxidation follow the procedure of application Serial No. 79,541, including known esterification procedures, temperatures between 20° C. to 270° C., under atmospheric or superatmospheric conditions, and removal of the water formed by inert-gas flushing, azeotropic distillation, etc., to shift the equilibrium, or by use of an excess of one reactant. The esterification is carried out by placing the extract polybasic acids, the polyol and modifying fatty acid (saturated or unsaturated) in a resin kettle, with or without a viscosity-reducing inert solvent such as xylene, and applying heat and agitation as soon as the polybasic acids are melted. The reaction is followed by determination of the acid number of the reaction mixture. At lower temperatures, e.g., 20° C., longer times are required. A preferred method is to heat the reaction mixture to the boiling point of the inert solvent, and gradually remove the vapors of solvent and allow the temperature to rise to about 250° C., or at least high enough to remove the water formed during the reaction. An esterification catalyst, such as paratoluene sulfonic acid, may be used; however, the reaction proceeds satisfactorily without a catalyst. About 35 to 70% by weight of extract polybasic acid is used with a neutralizing amount of polyol, which may vary from about 30% to 65% by weight and preferably is about 50% by weight, based on the total weight of the reaction mixture. Between about 15% to 65% by weight of modifying acid may be used and preferably the amount of modifying acid is about 20% by weight based on the total reaction mixture. Since the alkyd resin is higher boiling than the reactants, the separation of any unreacted polyol or modifying acid is facilitated. The resin may be oxidized in the resin kettle by following the known oxidation techniques at temperatures ranging from about 20° C. to about 130° C. The introduction of air or oxygen through some form of dispersion-means facilitates the reaction. Because the methods of esterification and oxidation are well-known, there is no necessity for further description.

Accordingly, the invention relates to oxidized alkyd resins of the formula

wherein R is the complex radicals derived from solvent extracts obtained in the solvent refining of mineral lubricating oils, $R^4$ is the hydrocarbon portion of a polyhydric alcohol, and $x$ has a value of 2 to 8 or higher. The foregoing resin can be cross-linked to another molecule through the R group or through a modifying dibasic acid, or by both types of cross-linking in the same molecule or in a chain molecule. The resins may be partially or completely esterified. The invention is also directed to oxidized simple linear polyesters of Formulae IV(a), IV(b) and IV(c), and oxidized esters of Formula V, VI(a), VI(b), VII and VIII wherein glycerol is the polyol, or any of the other polyols disclosed herein are used in place of glycerol. The oxidized alkyd resins of this invention are further defined as having a repeating unit of the formula

wherein R is the complex polynuclear, aromatic, heterocyclic radicals derived from solvent extracts, $R^2$ and $R^3$ are each hydrocarbon radicals containing from 6 to 12 carbon atoms and $z$ has a value of 3 to 9. The presence of non-interfering substituent groups on the $R^1$, $R^2$, $R^3$ and $R^4$ groups is not excluded from the definition of this invention. The products of this invention can be in the form of simple oxidized polyesters or complex oxidized polyesters of the formulae presented herein.

This invention also relates to the method of preparing oxidized alkyd resins wherein polycarboxylic acids derived from solvent extracts by metalation, carbonation and acidification are reacted under esterification conditions with a polyol, with or without a modifying acid of saturated or unsaturated character, using stoichiometric, less than stoichiometric, or excessive amounts of reactants, and oxidizing the resulting polyester to obtain a product of enhanced properties whether cross-linked or not.

The embodiments of the invention in which an exclusive property or privilege is claimed are defined as follows:

1. The partially oxidized alkyd resin reaction product of
   (1) a carboxylic acid prepared from solvent extracts obtained in the solvent extraction of mineral lubricating oils using a solvent selective for aromatic compounds, by reaction of said solvent extracts with an alkali metal to form the alkali metal adduct, carbonation of said adduct to form the corresponding alkali metal salt of a carboxylic acid and acidification of said salt to form the free acid, said carboxylic acid being characterized by having complex polynuclear, aromatic, alkylaromatic and heterocyclic nuclei predominating in carbon and hydrogen, containing about 1.9 to 4.5% by weight of combined sulfur, having an average molecular weight of about 300 to 600, having about 1.7 to 3.5 average number of aromatic rings per mean aromatic molecule and having 2 to 5 carboxyl groups per molecule,
   (2) a polyol of 3 to 10 carbon atoms per molecule and 3 to 10 hydroxyl groups per molecule, to form the polyester product, and
   (3) partially oxidizing said polyester with an oxidizing agent of the group consisting of air, oxygen and ozone by passing said oxidizing agent through said polyester in a vessel at a temperature of about 80° to about 120° C. for 1 to 100 hours at an oxygen concentration equivalent to 5 to 50 ml. of air per minute per 100 ml. of said polyester.

2. The oxidized alkyl resin reaction product in accordance with claim 1 in which about 100 to 200 parts of said complex carboxylic acid and about 33 to 200 parts of said polyol are reacted.

3. The oxidized alkyl resin reaction product in accordance with claim 1 in which said complex carboxylic acids are characterized by having an acid number of about 170 to about 280, a melting point of about 80° to 90° C., a bromine number of about 16 to 24, contain about 1.7 to 2.3 wt. percent of combined sulfur and are deep red in color.

4. The oxidized alkyl resin reaction product in accordance with claim 1 in which said polyol is of the group consisting of glycerine, diglycerol, pentaerythritol, adonitol, xylitol, and d-mannitol.

5. The oxidized alkyd resin reaction product in accordance with claim 4 in which said polyol is glycerine.

6. The oxidized alkyd resin reaction product in accordance with claim 4 in which said polyol is pentaerythritol.

7. The partially oxidized modified alkyd resin reaction product of
   (1) a carboxylic acid prepared from solvent extracts obtained in the solvent extraction of mineral lubricating oils using a solvent selective for aromatic compounds, by reaction of said solvent extracts with an alkali metal to form the alkali metal adduct, carbonation of said adduct to form the corresponding alkali metal salt of a carboxylic acid and acidification of said salt to form the free acid, said carboxylic acid being characterized by having complex polynuclear, aromatic, alkylaromatic and heterocyclic nuclei predominating in carbon and hydrogen, containing about 1.9 to 4.5% by weight of combined sulfur, having an average molecular weight of about 300 to 600, having about 1.7 to 3.5 average number of aromatic rings per mean aromatic molecule and having 2 to 5 carboxyl groups per molecule,
   (2) a polyol of 3 to 10 carbon atoms per molecule and 3 to 10 hydroxyl groups per molecule.
   (3) a fatty acid of the group consisting of saturated fatty acids of 6 to 24 carbon atoms per molecule, unsaturated fatty acids of 3 to 26 carbon atoms per molecule, dimer acids of up to 36 carbon atoms and mixtures thereof, to form the modified alkyd resin product, and
   (4) partially oxidizing said polyester with an oxidizing agent of the group consisting of air, oxygen and ozone by passing said oxidizing agent through said polyester in a vessel at a temperature of about 80° to about 120° C. for 1 to 100 hours at an oxygen concentration equivalent to 5 to 50 ml. of air per minute per 100 ml. of said polyester.

8. The oxidized modified alkyd resin product in accordance with claim 7 in which about 35 to 70 parts of said complex carboxylic acid is reacted with 30 to 65 parts of said polyol, and between about 15 to 65 parts of said fatty acid is used based on the total weight of reactants.

9. The oxidized modified alkyd resin product in accordance with claim 7 in which said complex carboxylic acids are characterized by having an acid number of about 170 to about 280, a melting point of about 80° to 90° C., a bromine number of about 16 to 24, contain about 1.7 to 2.3 wt. percent of combined sulfur and are deep red in color.

10. The oxidized modified alkyd resin product in accordance with claim 7 in which said polyol is glycerine and said fatty acid is dehydrated castor oil fatty acids.

11. The method of preparing partially oxidized alkyd resins which consists in reacting
    (1) with a carboxylic acid prepared from solvent extracts obtained in the solvent extraction of mineral lubricating oils using a solvent selective for aromatic compounds, by reaction of said solvent extracts with an alkali metal to form the alkali metal adduct, carbonation of said adduct to form the corresponding alkali metal salt of a carboxylic acid and acidification of said salt to form the free acid, said carboxylic acid being characterized by having complex polynuclear, aromatic, alkylaromatic and heterocyclic nuclei predominating in carbon and hydrogen, containing about 1.9 to 4.5% by weight of combined sulfur, having an average molecular weight of about 300 to 600, having about 1.7 to 3.5 average number or aromatic rings per mean aromatic molecule and having 2 to 5 carboxyl groups per molecule, (2) a polyol of 3 to 10 carbon atoms per molecule and 3 to 10 hydroxyl groups per molecule, to form the polyester product, (3) and partially oxidizing the polyester so formed with an oxidizing agent of the group consisting of air, oxygen and ozone by passing said oxidizing agent through said polyester in a vessel at a temperature of about 80° to about 120° C. for 1 to 100 hours at an oxygen concentration equivalent to 5 to 50 ml. of air per minute per 100 ml. of said polyester.

12. The method in accordance with claim 11 in which about 100 to 200 parts of said complex carboxylic acid and about 33 to 200 parts of said polyol are reacted.

13. The method in accordance with claim 11 in which said complex carboxylic acids are characterized by having an acid number of about 170 to about 280, a melting point of about 80° to 90° C., a bromine number of about 16 to 24, contain about 1.7 to 2.3 wt. percent of combined sulfur and are deep red in color.

14. The method in accordance with claim 11 in which said polyol is of the group consisting of glycerine, diglycerol, pentaerythritol, adonitrol, xylitol, and d-mannitol.

15. The method in accordance with claim 14 in which said polyol is glycerine.

16. The method in accordance with claim 14 in which said polyol is pentaerythritol.

17. The method of preparing partially oxidized alkyd resins which consists in reacting (1) a carboxylic acid prepared from solvent extracts obtained in the solvent extraction of mineral lubricating oils using a solvent selective for aromatic compounds, by reaction of said solvent extracts with an alkali metal to form the alkali metal adduct, carbonation of said adduct to form the corresponding alkali metal salt of a carboxylic acid and acidification of said salt to form the free acid, said carboxylic acid being characterized by having complex polynuclear, aromatic, alkylaromatic and heterocyclic nuclei predominating in carbon and hydrogen, containing about 1.9 to 4.5% by weight of combined sulfur, having an average molecular weight of about 300 to 600, having about 1.7 to 3.5 average number of aromatic rings per mean aromatic molecule and having 2 to 5 carboxyl groups per molecule, and (2) a polyol of 3 to 10 carbon atoms per molecule and 3 to 10 hydroxyl groups per molecule, with (3) a fatty acid of the group consisting of saturated fatty acids of 6 to 24 carbon atoms per molecule, unsaturated fatty acids of 3 to 26 carbon atoms per molecule, dimer acids of up to 36 carbon atoms and mixtures thereof, to form the modified alkyd resin product, and (4) partially oxidizing said polyester with an oxidizing agent of the group consisting of air, oxygen and ozone by passing said oxidizing agent through said polyester in a vessel at a temperature of about 80° to about 120° C. for 1 to 100 hours at an oxygen concentration equivalent to 5 to 50 ml. of air per minute per 100 ml. of said polyester.

18. The method in accordance with claim 17 in which about 35 to 70 parts of said complex carboxylic acid is reacted with 30 to 65 parts of said polyol, and between about 15 to 65 parts of said fatty acid is used based on the total weight of reactants.

19. The method in accordance with claim 17 in which said complex carboxylic acids are characterized by having an acid number of about 170 to about 280, a melting point of about 80° to 90° C., a bromine number of about 16 to 24, contain about 1.7 to 2.3 wt. percent of combined sulfur and are deep red in color.

20. The method in accordance with claim 17 in which said polyol is glycerine and said fatty acid is dehydrated castor oil fatty acids.

References Cited by the Examiner

UNITED STATES PATENTS

| | | | |
|---|---|---|---|
| 2,873,210 | 2/1959 | Barrett et al. | 260—22 |
| 2,970,164 | 1/1961 | Jezl | 260—75 |
| 2,971,932 | 2/1961 | Rickert | 260—22 |
| 3,129,192 | 4/1964 | Kramer et al. | 260—22 |
| 3,154,507 | 10/1964 | Kramer et al. | 260—22 |

OTHER REFERENCES

Conant et al.: J.A.C.S., vol. 50 (1928) pages 542–550.

Ellis: Chemistry of Synthetic Resins, vol. 2, Reinhold Pub. Corp., New York, 1935, page 918.

Chatfield, Varnish Constituents, 3rd edition, Leonard Hill Limited, London, 1953, pages 551 and 592.

LEON J. BERCOVITZ, *Primary Examiner.*

MILTON STERMAN, *Examiner.*